United States Patent [19]

Beom-Chae

[11] Patent Number: 4,805,206
[45] Date of Patent: Feb. 14, 1989

[54] FUNCTION CONTROLLER SERVING AS AN AUTOMATIC TELEPHONE ANSWERING MACHINE IN AN AUDIO/VIDEO COMPONENT SYSTEM

[75] Inventor: Jeong Beom-Chae, Seoul, Rep. of Korea

[73] Assignee: Sam Sung Electronics Co. Ltd., Suwon, Rep. of Korea

[21] Appl. No.: 899,814

[22] Filed: Aug. 25, 1986

[30] Foreign Application Priority Data

Aug. 24, 1985 [KR] Rep. of Korea .................. 10914

[51] Int. Cl.$^4$ .................. H04M 1/65; H04M 11/08
[52] U.S. Cl. .................. 379/77; 379/110; 379/441
[58] Field of Search .................. 379/68, 70, 74, 77, 379/80, 102, 110, 441; 358/85

[56] References Cited

U.S. PATENT DOCUMENTS

| | | | |
|---|---|---|---|
| 3,218,391 | 11/1965 | Hashimoto | 379/70 |
| 4,302,630 | 1/1981 | Ingegnoli et al. | 379/80 |
| 4,327,251 | 4/1982 | Fomenko et al. | 379/76 |
| 4,356,509 | 10/1982 | Skerlos et al. | 379/110 |
| 4,425,477 | 1/1984 | Magil | 379/110 |
| 4,427,847 | 1/1984 | Hofmann et al. | 379/110 |
| 4,438,527 | 3/1984 | Hammond | 379/102 |
| 4,456,925 | 6/1984 | Skerlos et al. | 379/110 |
| 4,465,902 | 8/1984 | Zato | 379/110 |

Primary Examiner—Raymond F. Cardillo
Assistant Examiner—James E. Tomassini
Attorney, Agent, or Firm—Watson, Cole, Grindle & Watson

[57] ABSTRACT

A function controller functions as an automatic telephone answering system in an audio/video component system and serves to control the volume level of an audio amplifier in the A/V system by detection of a telephone ringing signal as well as other functions normally associated with an automatic telephone answering system, such as code designated switching using DTMF circuitry.

5 Claims, 3 Drawing Sheets

FUNCTION CONTROLLER SERVING AS AN AUTOMATIC TELEPHONE ANSWERING MACHINE IN AN AUDIO/VIDEO COMPONENT SYSTEM

BACKGROUND OF THE INVENTION

1. Field of the Invention

This invention relates generally to a function controller which is used for controlling the operational functions of the various audio/video components in an A/V component system, and particularly to a function controller of an A/V component system, which can also serve as an automatic telephone answering machine.

2. Related Art

In recent years, An A/V component system has been put into practical use, which system is systematically contructed with all kinds of presently available audio/video equipment. Typical A/V component systems consist of a television tuner and an AM/FM tuner as basic components, and such systems also comprise other peripheral equipment, such as a VTR, turntable, cassette deck, audio amplifier and speakers, etc.

Additionally, there is an automatic telephone answering machine presently available, which will automatically sense the presence of a signal, such as "ringing potential" in a telephone line, and then perform several functions which enable the caller to receive a message from the called but absent party and also to leave a message when desired.

Now, considering that the reason why the rate of popularity of the A/V component system has been gradually increased in spite of its pretty high price is caused by its having a great many functional advantages. It may be estimated that the A/V component system even comprising an automatic telephone answering machine in addition to the existing audio/video equipment will be preferred even more.

Meanwhile, since today's various audio/video equipment has been constantly developed with much higher quality, the user of the A/V component system now can become satisfactorily to enjoy a high resolution image and hi-fi sound at the same time. Then the user, especially the audio fan, frequently has an inclination to listen to music or the other audio sounds with the volume level setting of the system set loudly.

However, if the telephone rings in the above situation, the operator can hardly hear the ringing sound because of its being absorbed into the loud audio sound output from the speaker. Additionally, in the case of talking over the telephone, there is the inconvenience that the operator has to manually preadjust the loud volume level to enable easier talking over such sound level.

SUMMARY OF THE INVENTION

It is the primary object of the invention to provide a function controller which is used for controlling the operational functions of the various audio/video components in an A/V component system.

Another object of the invention is to provide a function controller of an A/V component system, which can also serve as an automatice telephone answering machine.

Still another object of the present invention is to provide a function controller of an A/V component system, which can perform the function of automatically controlling the volume level of the system by detecting a telephone ringing signal.

Yet another object of the invention is to provide a function controller of an A/V component system, which can perform the function of automatically controlling the volume level of the system by sensing the hooked states of a telephone line.

BRIEF DESCRIPTION OF THE DRAWINGS

Other objects, advantages and features of the invention will become apparent from the following detailed specification in conjunction with the accompanying drawings, wherein.

DETAILED DESCRIPTION

Figure 2A:
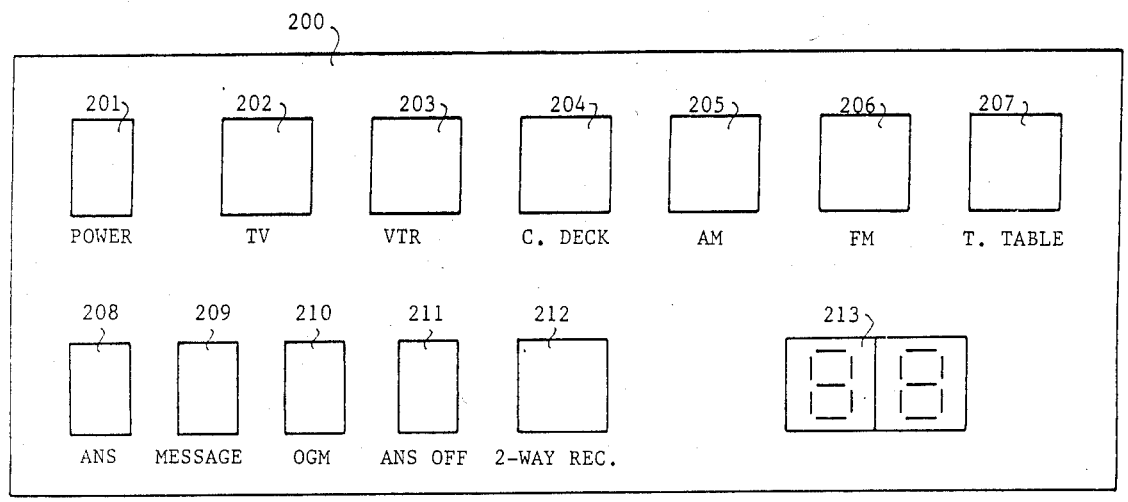
FIG. 2A is a front view of the illustrative function controller box having the circuit of FIG. 1.

Referring now to FIG. 2A, there is shown the front panel 200 of the illustrative function controller box of the invention. The front panel 200 of the function controller box comprises: a "POWER" button 201 which is used for supplying power to the system; a number of A/V function keys 202 through 207 which are respectively used for selecting the operational modes of the various audio/video components embodied in the A/V component system; several ATAM function keys 208 through 212 which are respectively used for selecting the operational functions of the automatic telephone answering machine; and a call counter 213 which is used for counting and displaying the number of the received incoming messages while performing the function of the automatic telephone answering machine.

Additionally, the rear panel 300 of the function controller box comprises: a record mode switch 301 for determining the record mode of incoming messages while performing the function of the automatic telephone answering machine; a code designation switch 302 for designating the secret code in the case of remotely controlling the function of the automatic telephone answering machine; the connectors 303 and 305 being connected with the system; and the telephone line connector 304 for connecting the telephone line.

Figure 1:
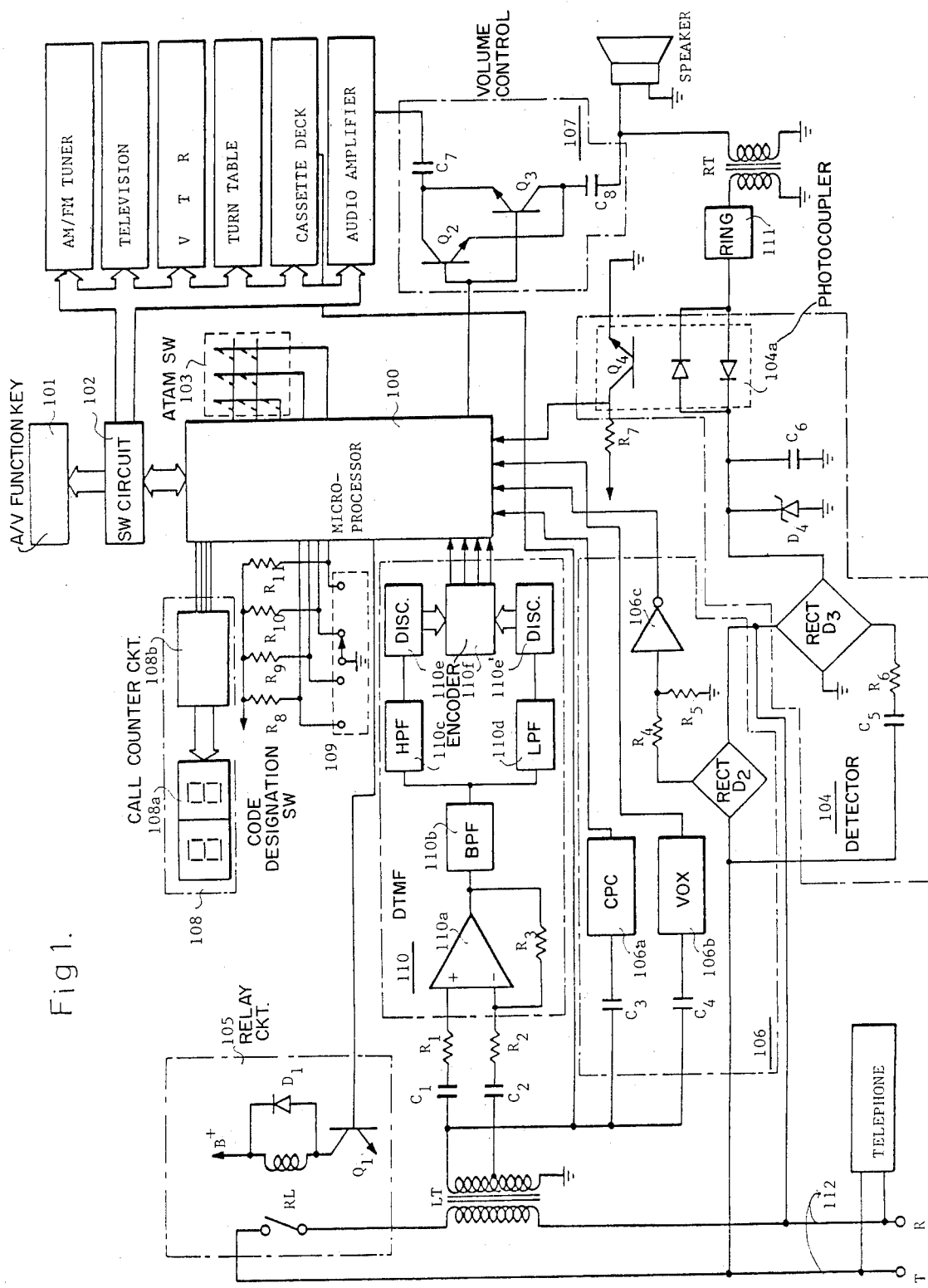
FIG. 1 is a concrete circuit diagram of the function controller embodying the principles of the invention, which shows the connections between a conventional A/V component system and a conventional telephone.
Figure 2B:
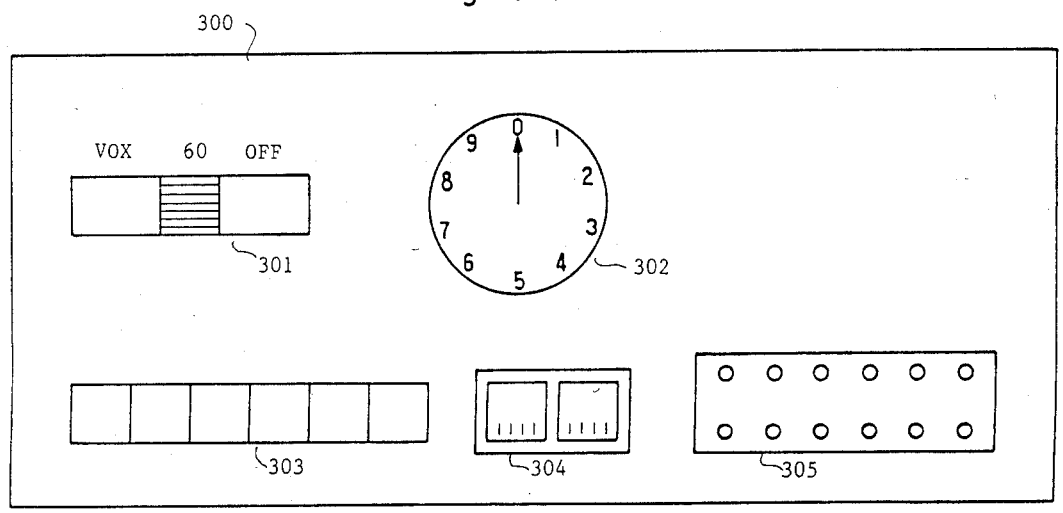
FIG. 2B is a rear view of the illustrative function controller box of FIG. 2A.

The function controller box of FIG. 2 includes the circuit of FIG. 1 embodying the principles of the invention. As shown in FIG. 1, the circuit of the function controller comprises: a microprocessor 100 for controlling the whole circuit; an A/V function key block 101 in which a number of function keys for selecting the operational modes of the various audio/video components are provided; a switching circuit 102 to which the various audio/video components are connected; an ATAM function key block 103 in which several function keys for selecting the operational functions of the automatic telephone answering machine; a detector 104 for detecting the ringing signal of a telephone; a relay circuit 105 for activating the telephone line 112; a sensor 106 for sensing the states of the telephone line 112; a volume control circuit 107 for controlling the volume level of the A/V component system; a call counter circuit 108 for counting and displaying the number of the received incoming messages; a code designation switch 109 for designating the secret code used in performing the function of remotely controlling the automatic telephone answering machine by MTMF (dual-tone-multi-frequency) signals; a DTMF receiver 110 for receiving and encoding the DTMF signal; and a ringer 111 for producing a ringing sound.

To operate the A/V component system, a user presses a "POWER" button 201 on the front panel 200, which allows power to flow to the system. "ANS OFF" key 211 is pressed for excluding the functions of the automatic telephone answering machine, and then one of the A/V function keys is depressed. For instance, if the operator wants to activate the turntable, he will press the corresponding "T. TABLE" key 207, which applies the selected data to the microprocessor 100 through a switching circuit 102. The microprocessor 100 processes the corresponding instruction, which allows the turntable to be activated. The audio sound from the turntable will be amplified in the audio amplifier by the amount of its volume level, and the amplified sound is applied to the speaker.

Figure 3:
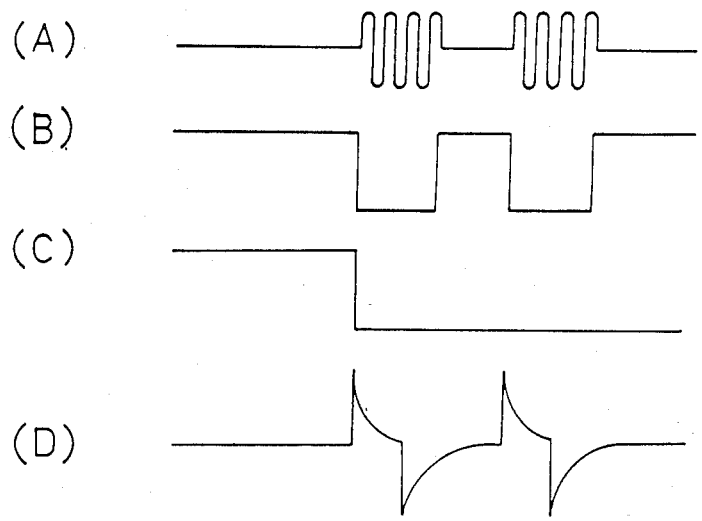
FIGS. 3A through 3D are the views of the signal waveforms which are used in performing the function of automatically controlling the volume level of the A/V component system.

If a telephone is called in the above situation, the ringing signal as shown in FIG. 3A is induced in the telephone line 112. The ringing signal of FIG. 3A will be applied to the detector 104. In detector 104 the ringing signal is DC-coupled via a capacitor C5 and a resistor R6. The DC-coupled signal is rectified through rectifier D3 and a capacitor C6. Then the rectified signal as shown in FIG. 3B is applied to the photocoupler 104a. A zener diode D4 is used for preventing surge current.

The rectified DC voltage is now applied to ringer 111 through a photocoupler 104a. Since transistor Q4 in the photocoupler 104a is turned ON, the low level signal as shown in FIG. 3C is applied to the microprocessor 100. Accordingly, the low level signal output from the microprocessor 100 as shown in FIG. 3C is applied to the base of transistor Q2 and simultaneously to the base of transistor Q3, which allows transistor Q2 and Q3 to be turned OFF. Therefore, the audio sound from the audio amplifier can not be transmitted to the speaker, whereas the ringing sound converted via a ringer 111 is transmitted to the speaker. That is, the output signal from the ringer 111, as shown in FIG. 3D, is supplied to the ring transformer RT, and the induced signal in the ring transformer RT is transmitted to the speaker.

At this time, if a user picks up the receiver of the telephone set, the potential of the telephone line is dropped from 48V to 5V. Since the value of the resistor R5 is 1/9 of the value of resistor R4, the voltage across the resistor R5 will be 0.5V. Accordingly, the output from inverter 106a is a high level signal, and it is supplied to the microprocessor 100. Then, the microprocessor 100 acknowledges the off-hooked state, and the low level signal from the microprocessor 100 is supplied to the respective transistors Q2 and Q3 of the volume control circuit. Since the transistors Q2 and Q3 are turned OFF, the output audio sound can not be transmitted to the speaker, which allows the audio sound to be easily talked over.

After finishing calling, if the user puts down the receiver, the potential of the telephone line 112 is turned up to 48V. Now the voltage across resistor R5 is 4.8V. Then the low level signal is supplied to the microprocessor 100 through the inverter 106c. Additionally, the output signals from the CPC (Calling Party Control) 106a and VOX (Voice Activiation) 106b are applied to the microprocessor 100. Then microprocessor 100 acknowledges the on-hooked state, and a high level signal is applied to the respective transistors Q2 and Q3, which are then turned ON such that the output audio sound is transmitted to the speaker.

Now consider the operation of an automatic telephone answering machine. To operate the function controller of FIG. 1 as an automatic telephone answering machine, a user, in preparation for leaving his telephone unattended, presses "OGM" key 210. The user then depresses a record key (not shown) on the cassette deck, and prerecords a message onto a tape (not shown), which will be automatically played back to the caller when a ringing signal is detected. Subsequently, if the telephone is called up, the ringing signal will pass through capacitor C5, resistor R6 and rectifier D3. Then the high level signal output from photocoupler 104a is applied to the microprocessor 100. The resultant high level signal output from microprocessor 100 is applied to the relay circuit 105 which allows relay RL to be activated. At this time the telephone line 112 is to be connected to the cassette deck. Accordingly, the cassette deck performs the function of playing back the tape onto which the outgoing message is prerecorded.

After finishing the playback operation, the cassette deck performs the function of recording the incoming message.

The call counter 108a or 213 is used for displaying the number of incoming messages. The instruction from the microprocessor 100 is applied to decoder 108b which decodes the instruction from the microprocessor 100 to drive a seven segment LED.

Now the DTMF remote control operation of the automatic telephone answering machine is described. If the user wants to record the incoming messages through the telephone, the operator calls his own telephone. After the outgoing message being sent out through the telephone receiver, the operator presses a DTMF secret code embodied in the DTMF telephone set. In this case, the designation of the secret code is performed by using the DTMF code designation switch 302.

Figure 4:
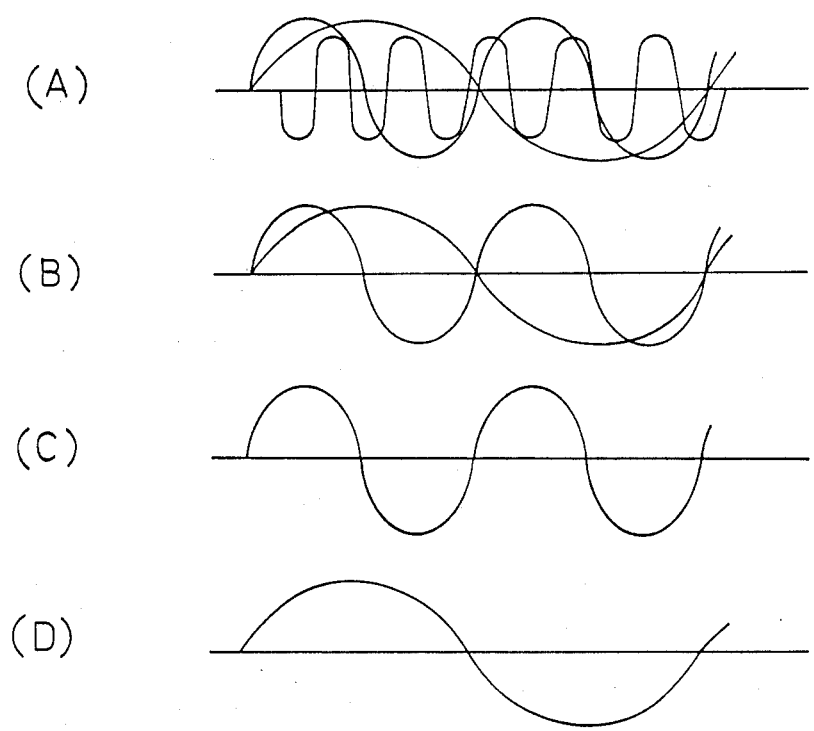
FIGS. 4A through 4D are the views of the signal waveforms which are used in performing the function of remotely controlling the automatic telephone answering machine by using a DTMF signal.

The induced DTMF signal in the line transformer LT, as shown in FIG. 4A, is applied to the operational amplifier 110a through capacitors C1, C2 and resistors R1 and R2. The amplified signal of operational amplifier 110a now passes through a BPF 110b and its output signal is as shown in FIG. 4B.

The signal of FIG. 4B is simultaneously applied to the HPF 110c and LPF 110d, and their output signals are respectively as shown in FIGS. 4C and 4D. The output signal from HPF 110c and LPF 110d is converted to a digital signal through a digital frequency discriminators 110e, 110e' and an encoder 110f, and then applied to microprocessor 100. Microprocessor 100 acknowledges that the input signal equals the secret code and then performs the functions necessary for remote control.

To those skilled in the art to which this invention relates there are many changes in construction and widely differing embodiments and application of the invention that will suggest themselves without departing from the spirit and scope of the invention. The disclosures and the description herein are purely illustrative and are not intended to be in any sense limiting.

We claim:

1. A function controller combined with an automatic telephone answering machine, abbreviated ATAM in an audio/video component system, whereby said ATAM comprises means for delivering an announcement message to a caller and means for recording an incoming message from said caller, said controller comprising:
   a microprocessor for controlling the audio/video component system;
   an audio video function key block including a number of function keys for selecting the operational functions of the audio/video components;
   a switching circuit to which the audio/video components are connected;
   an ATAM function key block including several function keys for selecting the operation mode when the ATAM is to be operable;
   a detector for detecting the ringing signal of at least one telephone;
   a relay circuit for activating the telephone line;
   a sensor for sensing the state of the telephone line;
   a volume control circuit for controlling the volume level of the audio/video component system;
   a call counter circuit for counting and displaying the number of ATAM recorded incoming messages;
   a code designation switch for designating a secret code when the function of the ATAM is being controlled by using a dual tone multifrequency, abbreviated DTMF, signal;
   a DTMF receiver for receiving and encoding the DTMF signal; and
   a ringer for converting the ringing signal to a ringing sound.

2. A function controller for controlling an audio/video component system including an automatic telephone answering machine, abbreviated ATAM, comprising means for delivering an announcement message to a caller and means for recording an incoming message from said caller, said function controller comprising:
   a number of function keys for respectively selecting a different operational function of a number of audio/video components;
   a microprocessor for controlling the audio/video component system;
   a switching circuit for interconnecting the number of function keys and number of audio/video components to the microprocessor; and
   at least one ATAM function key for instructing the microprocessor to select the ATAM such that the audio/video component system enable the ATAM wherein said audio/video components include an audio amplifier for amplifying audio signals from at least one of an AM/FM tuner and television receiver and wherein said ATAM includes detector means responsive to the ringing signal of a telephone connected to the function controller for initiating a control signal from said microprocessor to turn off said amplifier.

3. A function controller as claimed in claim 2, wherein said ATAM further includes DTMF receiver circuitry for sensing a telephone calling signal and providing a signal to said microprocessor indicative thereof.

4. A function controller as claimed in claim 3, wherein said ATAM further includes call counter circuitry for indicating the number of incoming messages received.

5. A function controller as claimed in claim 3, wherein said ATAM further includes code designation switch circuitry for identifying a secret code enabling an operator to obtain information pertaining to incoming messages from an outside telephone.

* * * * *